UNITED STATES PATENT OFFICE.

BERN L. BUDD, OF FAIRFIELD, CONNECTICUT.

IMPROVEMENT IN COMPOSITION PARAVASELINE PASTE.

Specification forming part of Letters Patent No. 190,122, dated May 1, 1877; application filed March 23, 1877.

*To all whom it may concern:*

Be it known that I, BERN L. BUDD, of the town of Fairfield, in the county of Fairfield and State of Connecticut, have invented certain new and useful Improvements in Composition Paravaseline Paste; and I do hereby declare that the following is a full, clear, and exact description thereof, which will enable others skilled in the art to which it appertains to make and use the same.

This invention relates to that class of compositions used to prevent the action of rust upon bright or polished iron or steel surfaces; and is composed of the substance known as "paraffine," and that known as "vaseline." To prepare the composition, I take of vaseline, nine pounds, and of refined paraffine, in shavings, one pound, place them in a porcelain dish over a water-bath, and apply heat until both are thoroughly melted. I then keep the mixture constantly stirred until it is cool. It is then ready for use.

I have used vaseline ever since its introduction as a lubricator to prevent the formation and action of rust. The fact that it contains in itself no element likely to change by oxidation or by becoming rancid, makes it more valuable than substances used prior to its introduction. The only drawback to its use is the fact that (in warm weather particularly) it is too thin, and lacks the body which a lubricator designed to cover a surface should possess. By adding a percentage of paraffine this difficulty is overcome, and a substance produced which may be kept unchanged for an unlimited time, and which is always ready for use.

I do not wish to be understood as confining myself to the proportions named. I have used it in various proportions, and, of course, find them all to answer the purpose; but I give a preference to the proportions I have named. I have also used the substance known as "ozokerite," and find it also to answer an excellent purpose in lieu of paraffine to stiffen the vaseline.

Having thus described my invention, what I claim as new, and desire to secure by Letters Patent, is—

A composition of vaseline and paraffine, substantially as and for the purpose specified.

In testimony that I claim the foregoing as my own I affix my signature in presence of two witnesses.

BERN L. BUDD.

Witnesses:
SAML. GLOVER,
THOMAS C. CONNOLLY.